(12) United States Patent
Metelski

(10) Patent No.: US 7,255,311 B2
(45) Date of Patent: Aug. 14, 2007

(54) STAND, IN PARTICULAR FOR SURGICAL MICROSCOPES, HAVING AN ENERGY STORAGE ELEMENT

(75) Inventor: Andrzej Metelski, Romanshorn (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 96 days.

(21) Appl. No.: 11/103,179

(22) Filed: Apr. 11, 2005

(65) Prior Publication Data

US 2005/0224670 A1 Oct. 13, 2005

(30) Foreign Application Priority Data

Apr. 12, 2004 (DE) ............. 10 2004 017 970

(51) Int. Cl.
*A47F 5/00* (2006.01)
(52) U.S. Cl. ................... 248/123.11; 248/325
(58) Field of Classification Search ............ 248/157, 248/419, 284.1, 162.1, 178.1, 187.1, 161, 248/414; 403/59, 60, 80, 116; 267/124
See application file for complete search history.

(56) References Cited

U.S. PATENT DOCUMENTS

| | | | | |
|---|---|---|---|---|
| 4,221,353 A * | 9/1980 | Kuhn et al. | ............ | 248/292.11 |
| 4,523,732 A * | 6/1985 | Biber et al. | ............ | 248/123.11 |
| 4,682,749 A * | 7/1987 | Strater | ............ | 248/284.1 |
| 4,852,842 A * | 8/1989 | O'Neill | ............ | 248/284.1 |
| 5,180,136 A * | 1/1993 | Sova | ............ | 248/576 |
| 5,213,293 A * | 5/1993 | Muentener et al. | .... | 248/123.11 |
| 5,492,296 A * | 2/1996 | Biber | ............ | 248/292.13 |
| 5,579,874 A * | 12/1996 | Jeffries et al. | ............ | 188/282.9 |
| 5,738,316 A * | 4/1998 | Sweere et al. | ............ | 248/123.11 |
| 5,743,503 A * | 4/1998 | Voeller et al. | ............ | 248/284.1 |
| 5,826,846 A * | 10/1998 | Buccieri et al. | ............ | 248/280.11 |
| 5,876,008 A * | 3/1999 | Sweere et al. | ............ | 248/325 |
| 5,919,159 A * | 7/1999 | Lilley et al. | ............ | 604/70 |
| 6,012,693 A * | 1/2000 | Voeller et al. | ............ | 248/280.11 |
| 6,082,552 A * | 7/2000 | Pollock et al. | ............ | 211/18 |
| 6,186,460 B1 * | 2/2001 | Lin | ............ | 248/284.1 |
| 6,592,090 B1 * | 7/2003 | Li | ............ | 248/284.1 |
| 7,014,157 B2 * | 3/2006 | Oddsen | ............ | 248/280.11 |
| 2002/0100851 A1 * | 8/2002 | Abramowsky et al. | .. | 248/284.1 |
| 2002/0121579 A1 * | 9/2002 | Metelski | ............ | 248/127 |
| 2002/0144558 A1 * | 10/2002 | Metelski | ............ | 73/862.621 |
| 2003/0178758 A1 * | 9/2003 | Metelski | ............ | 267/166 |
| 2005/0001120 A1 * | 1/2005 | Oddsen | ............ | 248/274.1 |
| 2005/0224664 A1 * | 10/2005 | Metelski | ............ | 248/123.11 |

FOREIGN PATENT DOCUMENTS

EP B1-433 426 2/1994
JP 2000172183 A 6/2000

* cited by examiner

*Primary Examiner*—Ramon O. Ramirez
*Assistant Examiner*—Bradley Duckworth
(74) *Attorney, Agent, or Firm*—Hodgson Russ LLP

(57) ABSTRACT

The invention concerns a stand arrangement having an energy storage element (7) and a displacement apparatus (18*b*) for rotating and/or shifting the proximal articulation point (9*a*) of the energy storage element (7), and an optimized balancing procedure.

8 Claims, 7 Drawing Sheets

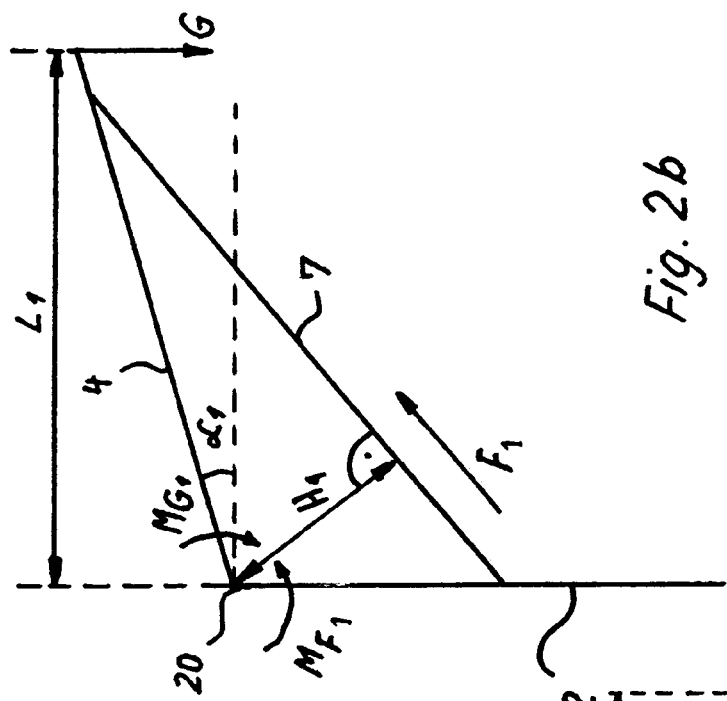
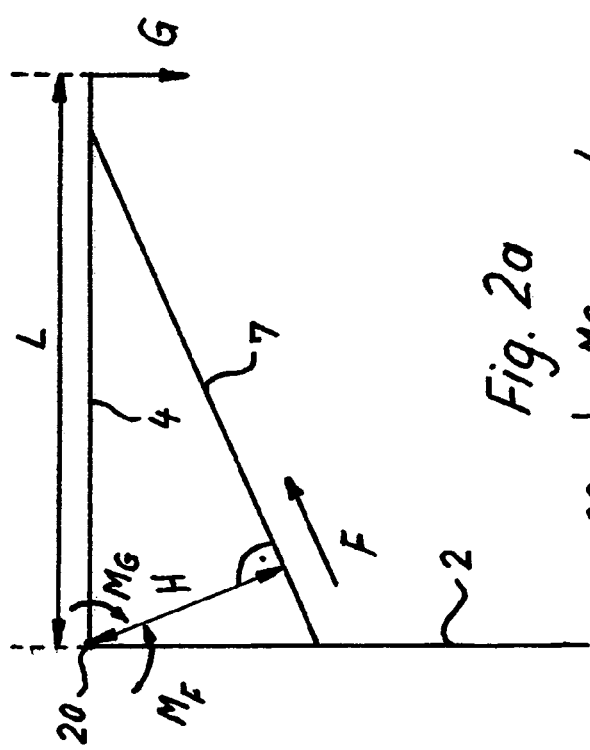
Fig. 2a
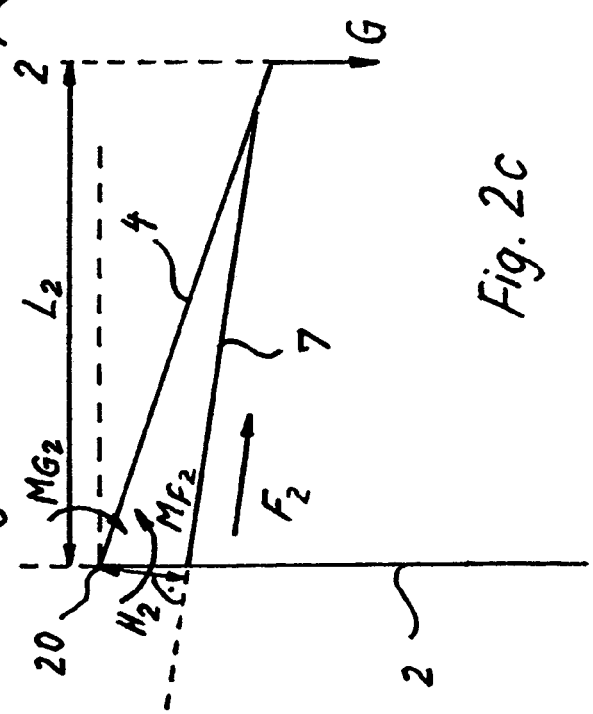
Fig. 2b
Fig. 2c

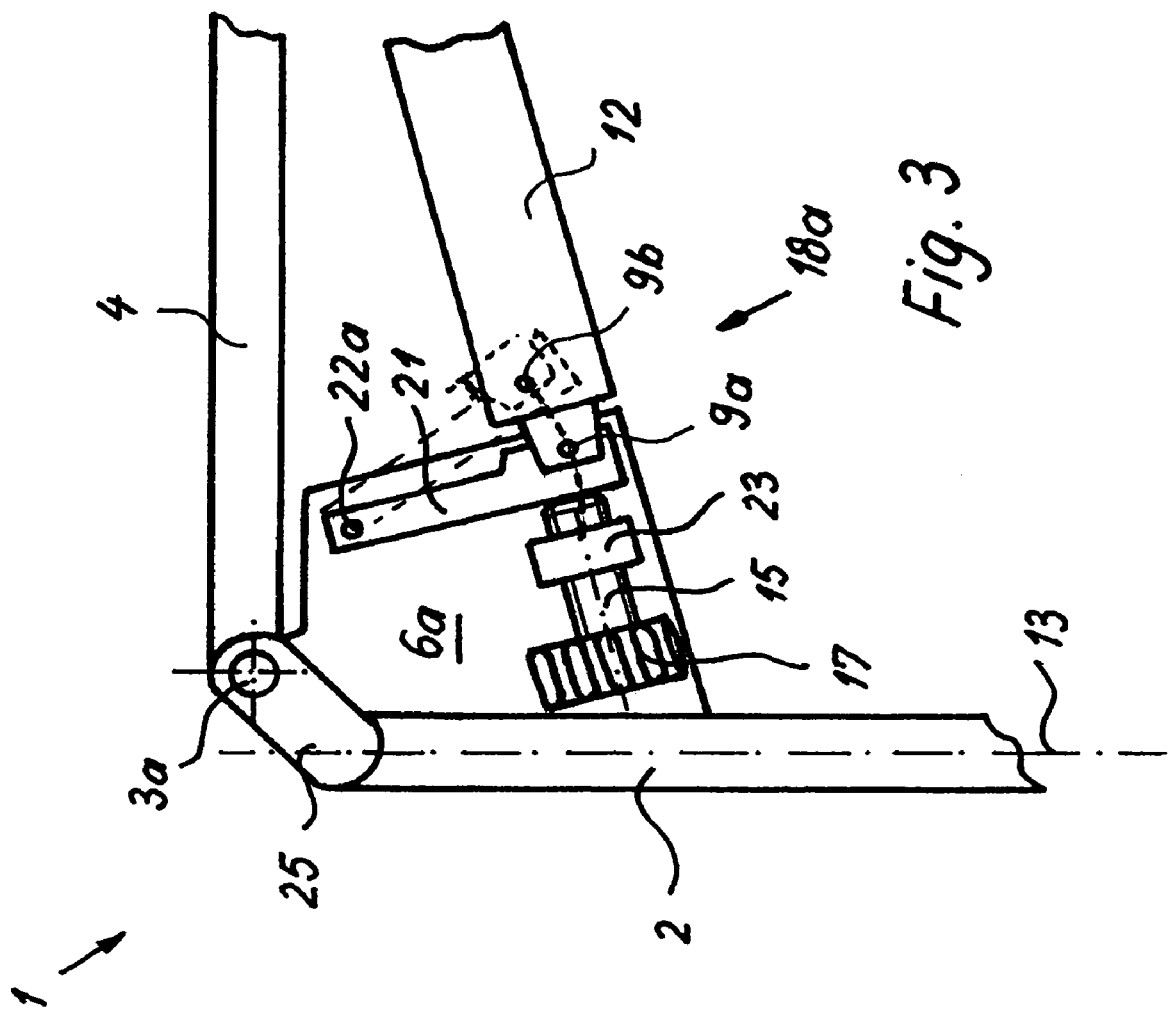

STAND, IN PARTICULAR FOR SURGICAL MICROSCOPES, HAVING AN ENERGY STORAGE ELEMENT

CROSS REFERENCE TO RELATED APPLICATIONS

This application claims priority of the German patent application 10 2004 017 970.0 filed Apr. 12, 2004, which is incorporated by reference herein.

FIELD OF THE INVENTION

The invention concerns a stand, in particular a stand for a surgical microscope, having one or more energy storage elements. "Energy storage elements" are understood in general to be elements that are suitable for absorbing energy or force and delivering it again, or converting it into a different form of energy, in defined fashion. Relevant in this context are springs of mechanical, pneumatic, or hydraulic type or a combination of such types, or shock absorbers. Gas springs are primarily used in stand construction, in particular for surgical microscopes, but springs of the other aforementioned types are also implemented.

BACKGROUND OF THE INVENTION

In order to achieve a maximally space-saving stand configuration, stands having energy storage elements dispense with a counterbalancing arm configured as a counterweight, or a counterweight that is located opposite a horizontal support of the stand.

Conventional stands with gas-spring bracing have proven successful, but are used only in stands that exhibit moderately homogeneous movement. Different types of bracing, for example the balance-like weight/counterweight system, are used for stands that need to be used over a larger movement space and/or with more convenient movement guidance.

Conventional gas-spring-braced stands have the disadvantage that because of the so-called "cosine function" of the load lever effect of the microscope along its vertical movement arc, the bracing effect that is present differs as a function of the angular position of the horizontal support with respect to the vertical support. The force on the gas spring acting as the supporting lever is also greatest with the stand in the pivot position in which the load is located farthest away from the vertical support when the horizontal support and vertical support form a right angle.

EP-B1-433 426 describes a compensating apparatus, having a gas spring as the energy storage element, that encompasses an arc-shaped or kidney-shaped elongated guidance hole on the vertical support in which the proximal end of a piston rod is guided, while the cylinder constituting the distal end of the gas spring is secured pivotably on the horizontal support. (In the remainder of this Application, "proximal" means "toward the vertical support" and "distal" means "away from the vertical support, toward the unattached end of the horizontal support".) This construction with an arc-shaped elongated guidance hole is theoretically intended to prevent the hysteresis of the gas spring from becoming disadvantageously perceptible. "Hysteresis" is understood in general to mean the dependence of the physical state of an object on previous states, based on a residual effect (remanence) after removal of the applied physical magnitude or force.

It has been found in practical use, however, that this known configuration is disadvantageous in that the proximal end of the piston rod does not move continuously in the arc-shaped elongated guidance hole but instead, when used, jumps from one extreme position to the other in the manner of a toggle lever; for a user, this requires an additional movement across the jumping point in order to achieve readjustment of the support conditions in the arc-shaped elongated guidance hole.

An optimally balanced-out stand that is homogeneously pivotable in the vertical exhibits an equality between the weight torque and support torque. An inequality between these two torques is expressed, for the operator, in two disadvantageous ways: either the microscope moves by itself into a different location, or for one range the operator requires one specific pivoting force in order to move the microscope, but then suddenly a different force. The optimum, desirable equality between the weight and support torques does not really exist, however, because of actual physical or geometrical circumstances, but exists only for a certain range. That range can be in the middle of the overall pivot angle range, or at the margins; but with the known stand approaches using energy storage elements a compromise is always arrived at between the optimum and disadvantageous range. In the existing art, an attempt is made to minimize this compromise by, for example, keeping the weight fluctuations at the microscope as low as possible, keeping the pivot angle as small as possible, or concealing the difference in torques within an elevated system friction. These actions, however, place limits on the stand design.

The optimum range is usually placed in the middle of the overall pivot angle range, which corresponds approximately to a horizontal position of the horizontal arm. The result, when depicted in a diagram of the difference in torques, is a wave-shaped curve such as FIG. 6a (pivot force curve function). There are, however, stand settings that make the optimum range of equality between the weight and support torques available, for example, in the lower pivot angle range. In this case the curve corresponds to a non-wave-shaped, arc-shaped function curve with appended straight lines, for example FIG. 6b.

The inventor has recognized that once the proximal articulation point for the widest possible optimum range of equality between the torques has been discovered or calculated, a deliberately effected slight adjustment of the proximal articulation point, to the detriment of the optimum range, results in a considerable reduction in the maximum difference between the torques. This result is unexpected, since one would necessarily have assumed that a displacement of the optimum articulation point would result in an even greater difference between the torques. The maximum difference decreases, however, and substantially (i.e. by more than half). The magnitude of this improvement is also unexpectedly high. As the diagram depicts, the wave-shaped curve is transformed into a saddle-shaped curve, and the arc-shaped function curve with attached straight lines is transformed into a new curve having a substantially lower amplitude.

SUMMARY OF THE INVENTION

It is thus the object of the invention on the one hand to arrive at an improved system having energy-storage-element bracing, in particular gas-spring bracing, that is adjustable to different loads, and on the other hand to eliminate the disadvantageous cosine effect of the horizontal support under the load of the microscope, or reduce it sufficiently that it is no longer an annoyance. The toggle-lever jump effect is also to be eliminated. At the same time, the inventor's understanding with regard to pivot angle geometry and pivot angle behavior is to be applied to stands of the species and utilized in order to achieve an improvement in the usability and operating convenience of the stand.

This object is achieved by way of a displacement apparatus for an articulation point of the energy storage element, preferably for the proximal articulation point that is located on the vertical support of the stand. According to an embodiment of the invention, a displacement apparatus is provided that, according to the present invention, acts approximately horizontally. "Horizontal" is to be understood as the displacement direction that lies transversely to the longitudinal axis of the vertical support of the stand. This can be a straight line or also an arc. This transverse (horizontal) direction acts, for example, approximately along the longitudinal axis of the energy storage element or along arcs that extend approximately along the longitudinal taxis of the energy storage element. This displacement device allows the support torque to be influenced.

The displacement according to the present invention of the proximal articulation point can occur, according to the present invention, preferably in the three following variant manners: A first variant comprises a rotation of the articulation point about an ascertained rotation point; the second is a purely linear shifting of the articulation point along an X axis that lies approximately parallel to the horizontal support. The third variant is a shifting of the articulation point followed by a rotation, or vice versa. With this embodiment it is preferably left to the user as to whether he or she performs the linear or the arc-shaped displacement first.

The above-described approximately horizontal displacement of the articulation point (whether by rotation or by shifting along the X axis or by a combination thereof) is thus defined for a specific weight of the load (microscope). In order to implement settings for other weights as well, provision is made according to the present invention for an additionally arranged and combined displacement, known from the existing art, in an approximately vertical direction along a Z axis parallel to the longitudinal axis of the vertical support of the stand (stand column). In the context of the invention, however, this displacement along the Z axis is preferably performed not linearly but in arc-shaped fashion.

The present application discloses a displacement apparatus that need not, for cost reasons, be arranged on every stand that is manufactured, but can also be used, in the manner of a "calibration apparatus," for the manufacture of stands without a displacement apparatus. Those stands are adjusted, in accordance with the calibration apparatus, in such a way that, for a specific weight, they optimally define the articulation point on the column.

Reference is explicitly made to the possibility of combining this Application with an application filed by the same Applicant which claims priority of German patent application no. DE 10 2004 017 971.9 filed Apr. 12, 2004 and which discloses a stand having an energy storage element that can be combined without restriction with the present displacement apparatus.

BRIEF DESCRIPTION OF THE DRAWINGS

Further embodiments of the invention are shown in the figures. The invention will be explained in more detail, symbolically and by way of example, with reference to the Figures. The Figures are described continuously and in overlapping fashion. Identical reference characters denote identical components; reference characters having the same numerical portion but different letter indices indicate similar or functionally identical components. In the drawings:

FIGS. 2a-2c schematically depict the so-called "cosine effect" in three different positions;

FIG. 3 shows a displacement apparatus according to the present invention with which the proximal articulation point can be displaced by means of a rotation;

DETAILED DESCRIPTION OF THE INVENTION

Figure 1:
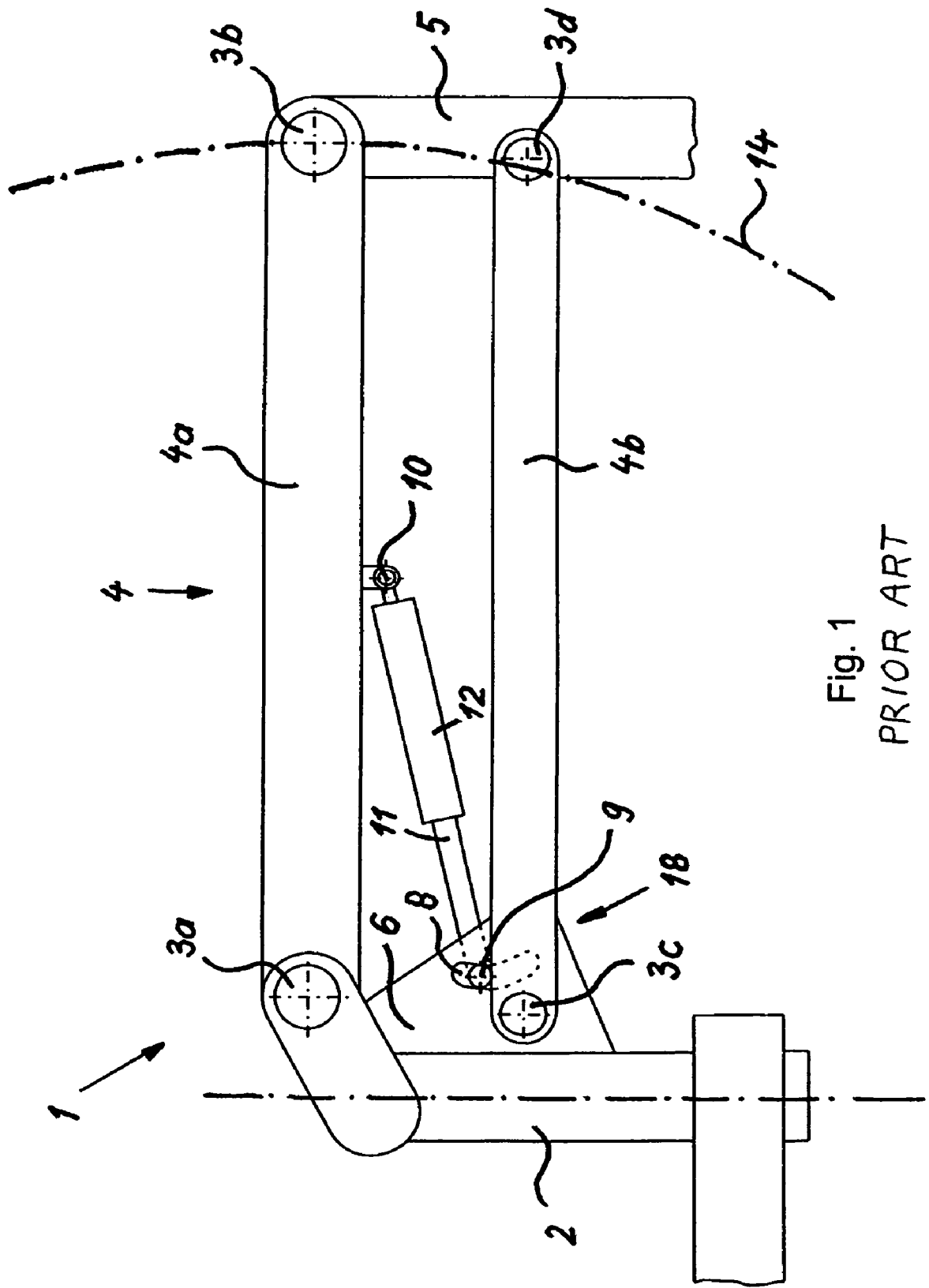
FIG. 1 shows a stand configuration according to the existing art.

FIG. 1 schematically depicts a stand arrangement 1 according to the existing art. Stand 1 comprises a vertical support 2 and a horizontal support 4 that is implemented as a parallelogram support having an upper horizontal support arm 4a and a lower horizontal support arm 4b. A gas spring is arranged, as a supporting energy storage element 7, at a distal articulation point 10 on upper horizontal support arm 4a of horizontal support 4 and at a proximal articulation point 9 in a plate 6. Stand 1 has, as a means for positively influencing hysteresis properties, a displacement apparatus 18 that does not act linearly but instead permits, by way of an arc-shaped elongated guide hole 8, a radial displacement of articulation point 9.

Gas spring 7 is arranged with a cylinder 12 at distal articulation point 10 and with a piston rod 11 at proximal articulation point 9. This stand arrangement furthermore comprises joints 3a-d and a microscope carrier 5. Horizontal support 4 pivots about pivot axis 13 in the horizontal position. In the vertical position, horizontal support 4 pivots along a movement arc 14.

FIGS. 2a-c schematically depict the lever effect as a function of various angles of horizontal support 4 with respect to vertical support 2 (the so-called "cosine effect"). FIG. 2a shows horizontal arm 4 in a horizontal position (angle between vertical support 2 and horizontal arm 4=90 degrees). Horizontal arm 4 carries load G at the distal end and corresponds in this position to lever arm L. The force F with which energy storage element 7 braces lever arm L is located at a (virtual) distance H from articulation point 20 of horizontal support 4 on vertical support 2. In this position, L*G=H*F. Ideally, the torques acting against one another in articulation point 20, namely weight torque $M_G$ and support torque $M_F$, are of equal magnitude. FIG. 2b shows horizontal arm 4 in a position pivoted up through an angle $\alpha_1$. Lever arm $L_1$ now corresponds to $L/\cos \alpha^1$, and $L_1*G$ is now equal to $H_1*F_1$. FIG. 2c shows horizontal arm 4 in a position pivoted downward through an angle $\alpha_2$. Lever arm $L_2$ now corresponds to $L/\cos \alpha_2$, and the applicable equation is $L_2*G=H_2*F_2$.

FIG. 3 shows a stand arrangement 1 according to the present invention that comprises a displacement apparatus 18a for rotating proximal articulation point 9a into a proximal articulation point 9b. This is achieved by the fact that articulation element 21 is secured on a plate 6a rotatably about a mount 22a, and an actuation of threaded spindle 15 via handwheel 17 or a motorized control system, within the fixedly arranged spindle nut 23, builds up or removes pressure on the rear side of articulation element 21. Articulation element 21 thus pivots about mount 22a, and proximal articulation point 9a describes a circular-arc-shaped movement to proximal articulation point 9b. The pivotable mount 22a can also be arranged on vertical support 2 or on a component 25 that connects vertical support 2 and horizontal support 4. These possible mounts for articulation element 21 have in common the fact that they must be fixed with respect to vertical support 2.

Figure 4:
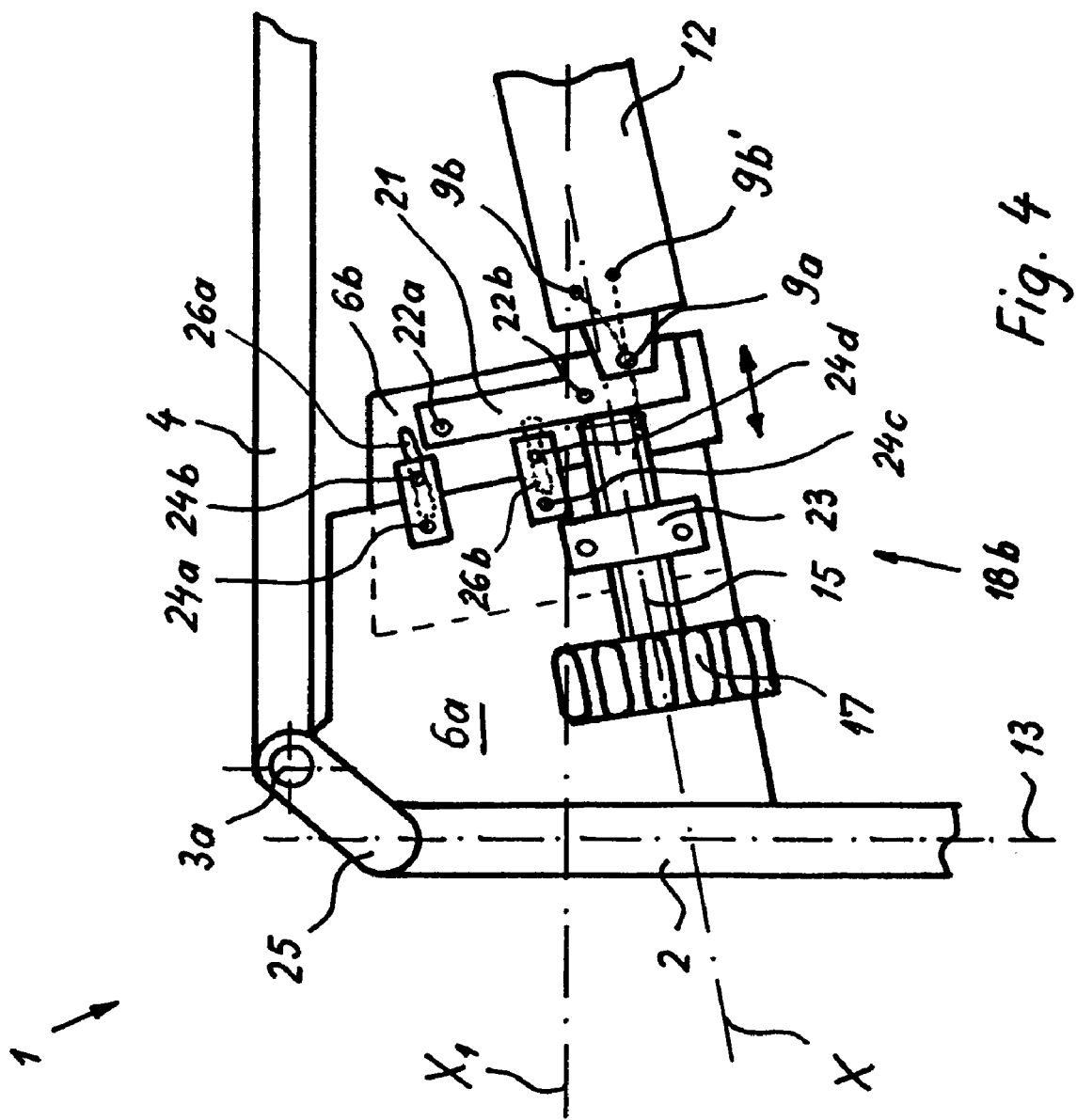
FIG. 4 shows a displacement apparatus on a stand, which apparatus displaces the proximal articulation point of the energy storage element both in the rotation direction shown in FIG. 3 and in a direction along an X axis that runs approximately parallel to the horizontal support.

FIG. 4 shows a displacement apparatus 18b that is operable not only radially, as already depicted in FIG. 3, but also linearly in a direction that corresponds to axes X or $X_1$ or an axis lying between X and $X_1$. This can be achieved in principle by a guided displacement movement of plate 6 or a plate portion 6b, whether by way of guide carriages or, as depicted, with elongated guidance holes 26a and 26b for mounts 24b and 24d of movable plate portion 6b on plate part 6a that is arranged fixedly on vertical support 2. Mounts 24a and 24c are fixed.

In order to implement a displacement apparatus that is as economical as possible and for which only one threaded spindle 15 suffices, articulation element 21 is equipped with a removable mount 22b. If proximal articulation point 9a needs to be rotated, mounts 24b and 24d must then be immovable and mount 22b must be removed. As a result, rotations of threaded spindle 15 cause articulation element 21 to pivot. If, on the other hand, displacement is to occur along the X axis, mount 22b must then be immobile and 24b and 24d must be disengaged.

As already mentioned, a displacement apparatus for a displacement along an axis $X_1$ can also easily be implemented by the fact that plate 6b sits on plate 6a with guidance by means of a guide carriage (not shown) instead of elongated guidance holes 26a and 26b, and is also provided with mounts.

Figure 5:
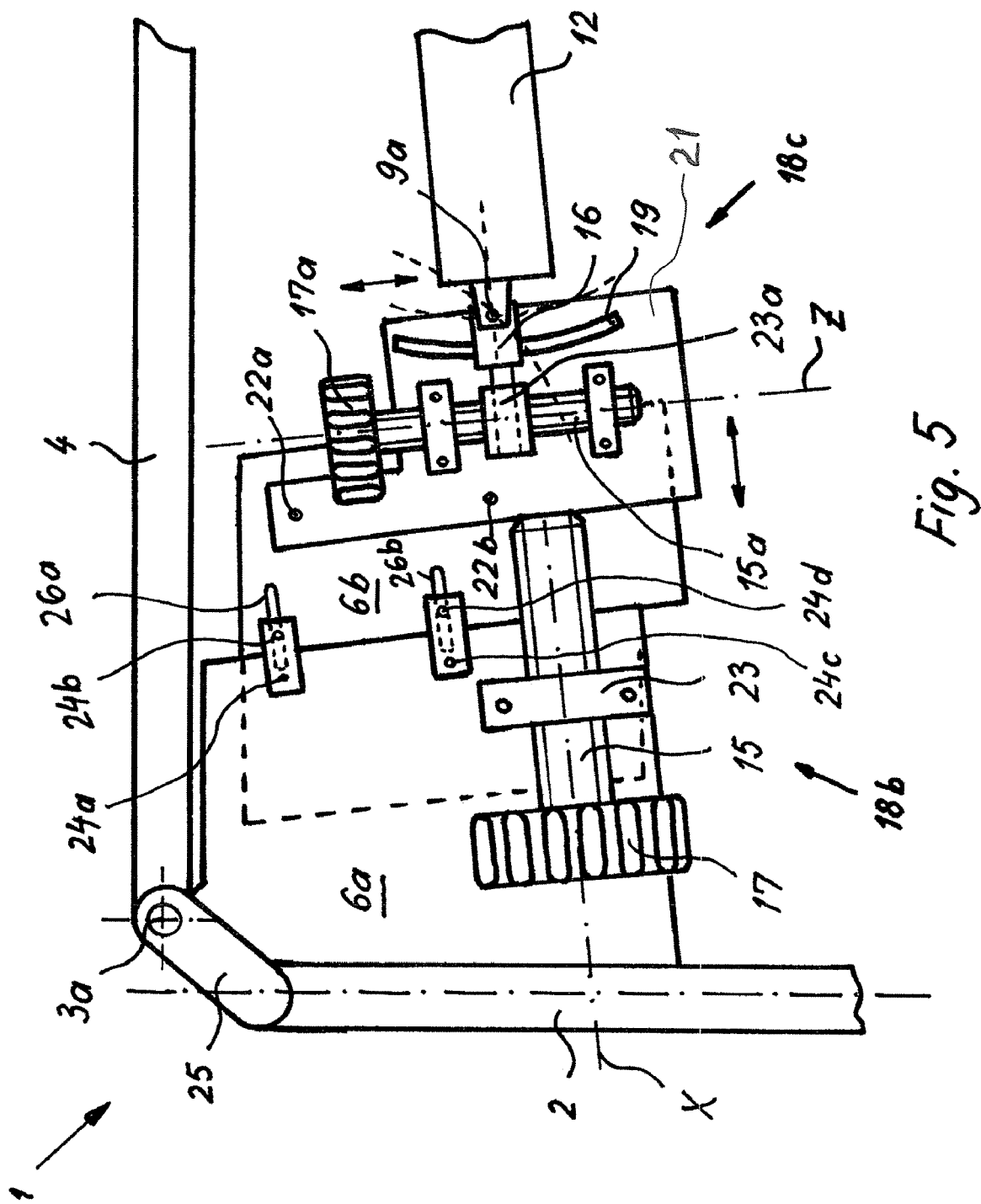
FIG. 5 shows a displacement apparatus on a stand, which apparatus displaces the proximal articulation point of the energy storage element both in the rotation direction shown in FIG. 3 and in the X displacement direction shown in FIG. 4, and in a vertical direction along a Y axis.

FIG. 5 shows, in addition to the displacement possibilities according to FIG. 4, a displacement, known from the existing art, of proximal articulation point 9a vertically along a Z axis. This displacement direction corresponds approximately to a parallel with respect to vertical support 2. A displacement apparatus 18c includes a threaded spindle 15a, operable via a handwheel 17a or in motorized fashion, arranged on articulation element 21 to cooperate with a moving spindle nut 23a, and displaces a carriage 16 that, upon rotation of threaded spindle 15a, runs along guides 19. Proximal articulation point 9a is articulated on carriage 16. Guides 19 can preferably, as depicted here, be configured in arc-shaped fashion; linear or combined guides are, however, also conceivable.

Figure 6A:
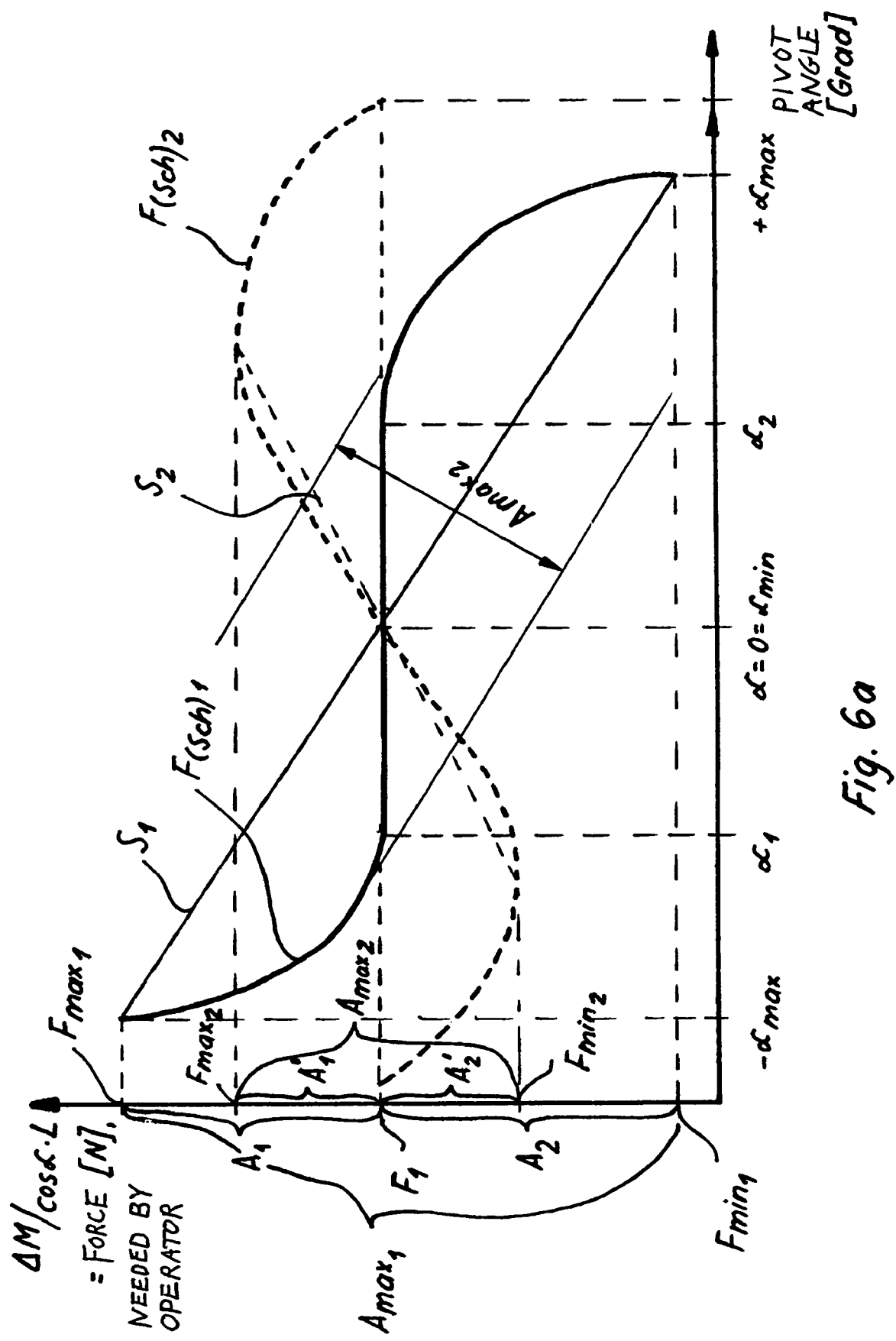
FIG. 6a is a diagram showing curves for the difference between the weight torque and support torque in the case of a pivot angle range optimized approximately at the center.

FIG. 6a is a diagram showing the curve of energy expenditure by the operator in order to pivot horizontal support 4 vertically, or along movement arc 14. This force expenditure is simply the difference between weight torque $M_G$ and support torque $M_F$ divided by the respective lever arm $L*\cos \alpha$. This diagram shows a balanced-out state that is optimized in a central pivot angle range from $\alpha_1$ through $\alpha=0$ (horizontal position of horizontal support 4) to $\alpha_2$. In this range, the operator must exert a force $F_1$ that remains constant. Beyond this pivot angle range, force F rises continuously, reaching an amplitude $A_1$ in the upward pivot direction beyond pivot angle $\alpha_1$, and an amplitude $A_2$ downward. This results in a wave-shaped pivot force curve $F_{(Sch)1}$ having a total amplitude $A_{max1}=A_1+A_2$. Connecting the points that correspond to $F_{min1}$ and $F_{max1}$ on the force axis yields the slope $S_1$, in other words, the overall characteristic curve of the overall pivot movement. The unexpected result according to the present invention of displacing articulation point 9a to 9b, after determining the articulation point 9a that yielded this wave-shaped curve, is a transformation of pivot force curve $F_{(Sch)1}$ into a new, rotated, flatter, saddle-shaped pivot force curve $F_{(Sch)2}$. The rotation is continued until, preferably, slope $S_1$ of the old, wave-shaped pivot force curve $F_{(Sch)1}$ ends up horizontal in the diagram, i.e. $S_1$ corresponds to only a single force value $F_1$. The new pivot force curve $F_{(Sch)2}$ is no longer continuous, and has a substantially lower slope $S_2$. Overall amplitude $A_{max2}$ is now determined by substantially lower values $F_{min2}$ and $F_{max2}$, or the sum of upper amplitude $A_1$ and lower amplitude $A_2$.

The effect is that the operator no longer has a homogeneous pivot angle range in which no force difference occurs, but in return has to exert substantially less force overall over the entire pivot angle range. Because the new force values $F_{min2}$ and $F_{max2}$ are so low, an increase or decrease is no longer appreciable or perceptible. The system according to the present invention thus makes it possible, for certain applications, to replace complex weight-type balancing systems with simple spring bracing systems without having to accept operating convenience disadvantages for the operator.

Figure 6B:
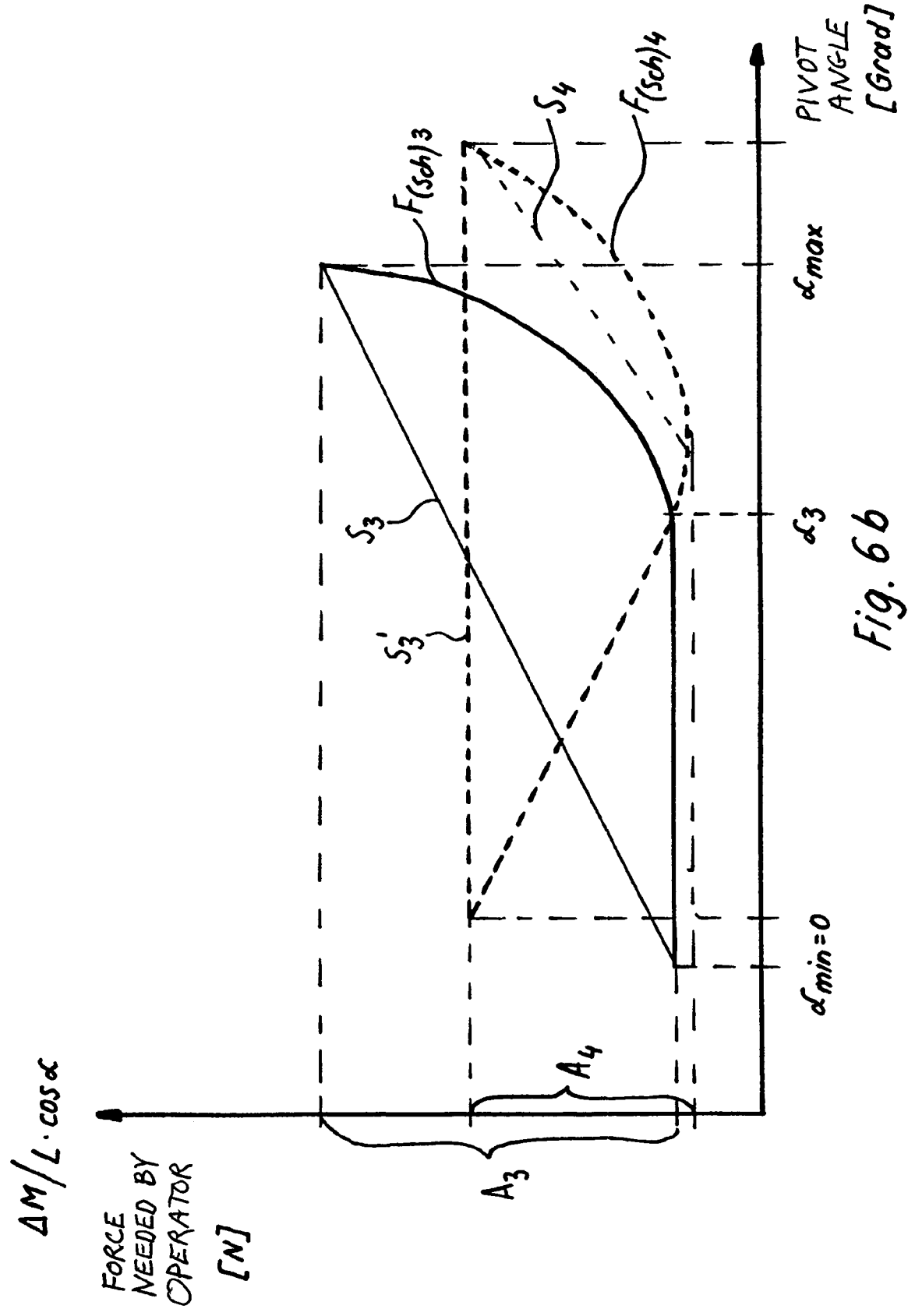
FIG. 6b is a diagram showing curves for the difference between the weight torque and support torque in the case of a pivot angle range that is optimized in the marginal range.

FIG. 6b is a diagram not for a balanced-out state around the horizontal position of horizontal support 4 in both directions, but instead, for example, for the lower pivot range. Pivot force curve $F_{(Sch)1}$ corresponding to first proximal articulation point 9a is arc-shaped with an attached straight line, and has a slope $S_3$ and an amplitude $A_3$. In this case as well, the result of determining, according to the present invention, the new proximal articulation point 9b is that pivot force curve $F_{(Sch)3}$ is "rotated" into a flatter pivot force curve $F_{(Sch)4}$ having a lower amplitude $A_4$ and a flatter slope $S_4$.

PARTS LIST

The Parts List is a constituent of the disclosure.
1 Stand
2 Vertical support
3a-3d Joint (joint 3a corresponds to 20)
4 Horizontal support
4a Upper horizontal support arm
4b Lower horizontal support arm
5 Microscope carrier
6, 6a-6b Plate
7 Energy storage element
8 Arc-shaped elongated guidance hole
9, 9a-9b Proximal articulation point
10 Distal articulation point
11 Piston rod
12 Cylinder
13 Pivot axis of 4
14 Movement arc of load
15, 15a Threaded spindle
16 Carriage 17, 17a Handwheel
18, 18a-c Displacement apparatus
19 Guide of 16
20 Articulation point of 4 on 2 (corresponds to 3a)
21 Articulation element
22a, 22b Mount of 21 on 6b
23 Spindle nut
24a-24d Mount of 6b on 6a
25 Component for connecting 2 and 4 (optional)
26a-26b Elongated guidance hole
$\alpha_{1-3}$ Angle between 4 in horizontal position and $L_{1-3}$
$\alpha_{min}$ Maximum pivot angle between 4 and $L_{1-3}$
$\alpha_{max}$ Maximum pivot angle between 4 and $L_{1-3}$
L Lever arm
G Load; weight
$F_{1-2}$ Support force
H Height; distance of 7 from 20
F1 Pivot force
$F_{min1, 2}$ Minimum pivot force
$F_{max1, 2}$ Maximum pivot force
$A_{1-4}$ Amplitude
$A_{max1, 2}$ Total amplitude
$F_{(Sch)1, 2}$ Pivot force curve
$S_{1-4}$ Slope
$X, X_1$ Axis
Z Axis
$M_G$ Weight torque
$M_F$ Support torque
$\Delta M$ Difference $M_G$–$M_F$
$\Delta M_1$ Difference $M_{F-MG}$

What is claimed is:

1. A stand for a surgical microscope, the stand comprising:
a vertical support having a vertical longitudinal axis;
a horizontal support articulated on the vertical support;
an energy storage element that is articulated at a proximal articulation point adjacent the vertical support and at a distal articulation point adjacent the horizontal support;
an articulation element (21) adjustably positionable relative to the vertical support, the articulation element having a guide (19) defining a generally vertical guide path;
a carriage (16) engaging the guide (19) for travel along the guide path, the proximal articulation point being coupled to the carriage for travel therewith;
a first displacement apparatus (18b) operable to displace the articulation element (21) relative to the vertical support to shift the proximal articulation point along a generally horizontal path; and
a second displacement apparatus (18c) operable to displace the carriage along the guide path to shift the proximal articulation point along a generally vertical path.

2. The stand as defined in claim 1, wherein the generally vertical path is an arcuate path.

3. The stand as defined in claim 1, wherein the first displacement apparatus is operable to displace the proximal articulation point along an arc about a rotation point (22a) while the rotation point is fixed relative to the vertical support.

4. The stand as defined in claim 3, wherein the rotation point is arranged on a plate connected to a side of the vertical support.

5. The stand as defined in claim 3, wherein the first displacement apparatus is operable to displace the proximal articulation point along an axis approximately parallel to the horizontal support.

6. The stand as defined in claim 5, further comprising a first plate fixed to the vertical support and a second plate mounted on the first plate for guided adjustment along the axis approximately parallel to the horizontal support, wherein the rotation point is arranged on the second plate.

7. The stand as defined in claim 6, wherein the articulation element is pivotally mounted on the second plate at the rotation point, a releasable mount is provided at a location spaced from the rotation point for selectively securing the articulation element against rotation about the rotation point, and the first displacement apparatus includes a spindle arranged to engage the articulation element at a location spaced from the rotation point.

8. A method for adjusting a proximal articulation point (9) of an energy storage element (7) in conjunction with a surgical microscope stand having a vertical support (2), a horizontal support (4) articulated on the vertical support, the stand being subjected to a weight torque ($M_G$) about an articulation point of the horizontal support, a support torque ($M_F$) generated by the energy storage element (7) about the articulation point of the horizontal support, the energy storage element (7) being articulated with its proximal articulation point (9) associated with the vertical support (2) and with its distal articulation point (10) associated with the horizontal support (4), and the horizontal support having a pivot angle range of movement about its articulation point between a minimum pivot angle ($\alpha$min) and a maximum pivot angle ($\alpha$max) or between a maximum negative pivot angle (–$\alpha$max) and a maximum positive pivot angle (+$\alpha$max), the method comprising the steps of:
ascertaining a first position for the proximal articulation point, corresponding to which first position there is a specific pivot angle range ($\alpha_1$-$\alpha_2$ or $\alpha_{min}$-$\alpha_3$) in which the torque difference ($\Delta M$) between the weight torque ($M_G$) and the support torque ($M_F$) is zero or most minimal;
then, proceeding therefrom, ascertaining a second position for the proximal articulation point, corresponding to which second position there is a minimal torque difference ($\Delta M$) over the entire pivot angle range ($\alpha_{min}$ to $\alpha_{max}$ or –$\alpha_{max}$ to +$\alpha_{max}$); and
fixing the proximal articulation point at the second position.

* * * * *